US011231579B1

(12) United States Patent
Calafiore et al.

(10) Patent No.: US 11,231,579 B1
(45) Date of Patent: Jan. 25, 2022

(54) CASCADED PUPIL-REPLICATING WAVEGUIDES

(71) Applicant: Facebook Technologies, LLC, Menlo Park, CA (US)

(72) Inventors: Giuseppe Calafiore, Redmond, WA (US); Ningfeng Huang, Redmond, WA (US); Andrew Maimone, Duvall, WA (US); Andrew Ouderkirk, Redmond, WA (US); Hee Yoon Lee, Bellevue, WA (US); Maxwell Parsons, Berkley, CA (US); Scott Charles McEldowney, Redmond, WA (US); Babak Amirsolaimani, Redmond, WA (US); Pasi Saarikko, Kirkland, WA (US); Wanli Chi, Sammamish, WA (US); Alexander Koshelev, Redmond, WA (US); Barry David Silverstein, Kirkland, WA (US); Lu Lu, Kirkland, WA (US); Wai Sze Tiffany Lam, Redmond, WA (US); Gang Li, Bothell, WA (US); Stephan Lutgen, Dresden (DE); Francois Gerard Franck Olivier, Cork (IE); David Massoubre, Cork (IE)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 292 days.

(21) Appl. No.: 16/252,442

(22) Filed: Jan. 18, 2019

(51) Int. Cl.
*G02B 27/00* (2006.01)
*G02B 27/01* (2006.01)
(Continued)

(52) U.S. Cl.
CPC ..... *G02B 27/0081* (2013.01); *G02B 27/0172* (2013.01); *G02B 27/0944* (2013.01);
(Continued)

(58) Field of Classification Search
CPC .... G02B 27/14; G02B 27/144; G02B 27/283; G02B 27/145; G02B 27/0172;
(Continued)

(56) References Cited

U.S. PATENT DOCUMENTS

2013/0051730 A1* 2/2013 Travers .............. G02B 27/4272 385/37
2017/0299860 A1* 10/2017 Wall ....................... G02B 6/003
(Continued)

*Primary Examiner* — William R Alexander
*Assistant Examiner* — Sharrief I Broome
(74) *Attorney, Agent, or Firm* — Pequignot + Myers; Matthew A. Pequignot

(57) ABSTRACT

A waveguide assembly is provided. The waveguide assembly includes a pair of pupil-replicating waveguides. The first pupil-replicating waveguide is configured for receiving an input beam of image light and providing an intermediate beam comprising multiple offset portions of the input beam. The second pupil-replicating waveguide is configured for receiving the intermediate beam from the first pupil-replicating waveguide and providing an output beam comprising multiple offset portions of the intermediate beam. The input beam may be expanded by the waveguide assembly in such a manner that pupil gaps are reduced or eliminated.

17 Claims, 8 Drawing Sheets

(51) Int. Cl.
*G02B 27/44* (2006.01)
*G02B 27/09* (2006.01)
*G02B 27/10* (2006.01)

(52) U.S. Cl.
CPC ......... *G02B 27/1086* (2013.01); *G02B 27/44* (2013.01); *G02B 2027/0145* (2013.01); *G02B 2027/0152* (2013.01)

(58) Field of Classification Search
CPC .............. G02B 27/142; G02B 27/1066; G02B 27/1006; G02B 27/141; G02B 27/0101; G02B 27/10; G02B 27/126; G02B 2027/0125; G02B 2027/0174; G02B 26/0833; G02B 27/0081; G02B 27/108; G02B 27/1086; G02B 27/123; G02B 5/30; G02F 1/133555; G02F 1/0126; G02F 1/0136; G02F 1/015; G02F 1/093; G02F 1/133308; G02F 1/13332; G02F 1/133504; G02F 1/133524; G02F 1/133528; G02F 1/133553; G02F 1/133562; G02F 1/133618; G02F 1/134309; G02F 1/1368; G02F 1/157; G02F 1/1677; G02F 1/212; G02F 1/31; G02F 1/37; H01S 3/0057; H01S 5/4012; H01S 5/405; H01S 3/005; H01S 3/09408; H01S 3/1618; H01S 5/005; H01S 5/4062; H01S 5/4087; H01S 2301/03; H01S 3/00; H01S 3/0014; H01S 3/0071; H01S 3/0092; H01S 3/067; H01S 3/06708; H01S 3/06712; H01S 3/06733; H01S 3/0675; H01S 3/06791; H04N 5/2254; H04N 9/3161; H04N 13/214; H04N 5/232; H04N 9/3147; H04N 9/3167; H04N 13/239; H04N 13/322; H04N 13/388; H04N 5/2258; H04N 5/2259; H04N 5/23212; H04N 5/232122; H04N 5/23238; H04N 7/18; H04N 9/3105; H04N 9/3126; H04N 9/3129; H04N 9/3152; H04N 9/3188; G01J 1/0411; G01J 11/00; G01J 1/0271; G01J 1/0407; G01J 1/0414; G01J 1/0429; G01J 1/0477; G01J 1/4257; G01J 2001/4261; G01J 2003/4424; G01J 2009/002; G01J 3/02; G01J 3/0202; G01J 3/0205; G01J 3/0237; G01J 3/0286; G01J 3/0291; G01J 3/26; G01J 3/42; G01J 3/427

See application file for complete search history.

(56) References Cited

U.S. PATENT DOCUMENTS

2018/0052320 A1* 2/2018 Curtis .................... G02B 7/008
2018/0120559 A1* 5/2018 Yeoh .................... G02B 5/3083
2018/0120563 A1* 5/2018 Kollin .................. G03H 1/2249

* cited by examiner

CASCADED PUPIL-REPLICATING WAVEGUIDES

TECHNICAL FIELD

The present disclosure relates to optical components, and in particular to waveguides usable in wearable displays.

BACKGROUND

Head-mounted displays (HMDs), near-eye displays (NEDs), and other wearable display systems can be used to present virtual scenery to a user, or to augment real scenery with dynamic information, data, or virtual objects. The virtual or augmented scenery can be three-dimensional (3D) to enhance the experience and to match virtual objects to real objects observed by the user. Eye position and gaze direction, and/or orientation of the user may be tracked in real time, and the displayed scenery may be dynamically adjusted depending on the user's head orientation and gaze direction, to provide a better experience of immersion into a simulated or augmented environment.

Lightweight and compact near-eye displays reduce strain on the user's head and neck, and are generally more comfortable to wear. The optics block of such displays can be the heaviest part of the entire system. Compact planar optical components, such as waveguides, gratings, Fresnel lenses, etc., may be employed to reduce size and weight of an optics block. However, compact planar optics may have limitations related to image quality, exit pupil size and uniformity, pupil swim, field of view of the generated imagery, visual artifacts, etc.

BRIEF DESCRIPTION OF THE DRAWINGS

Exemplary embodiments will now be described in conjunction with the drawings, in which.

DETAILED DESCRIPTION

Figure 1:
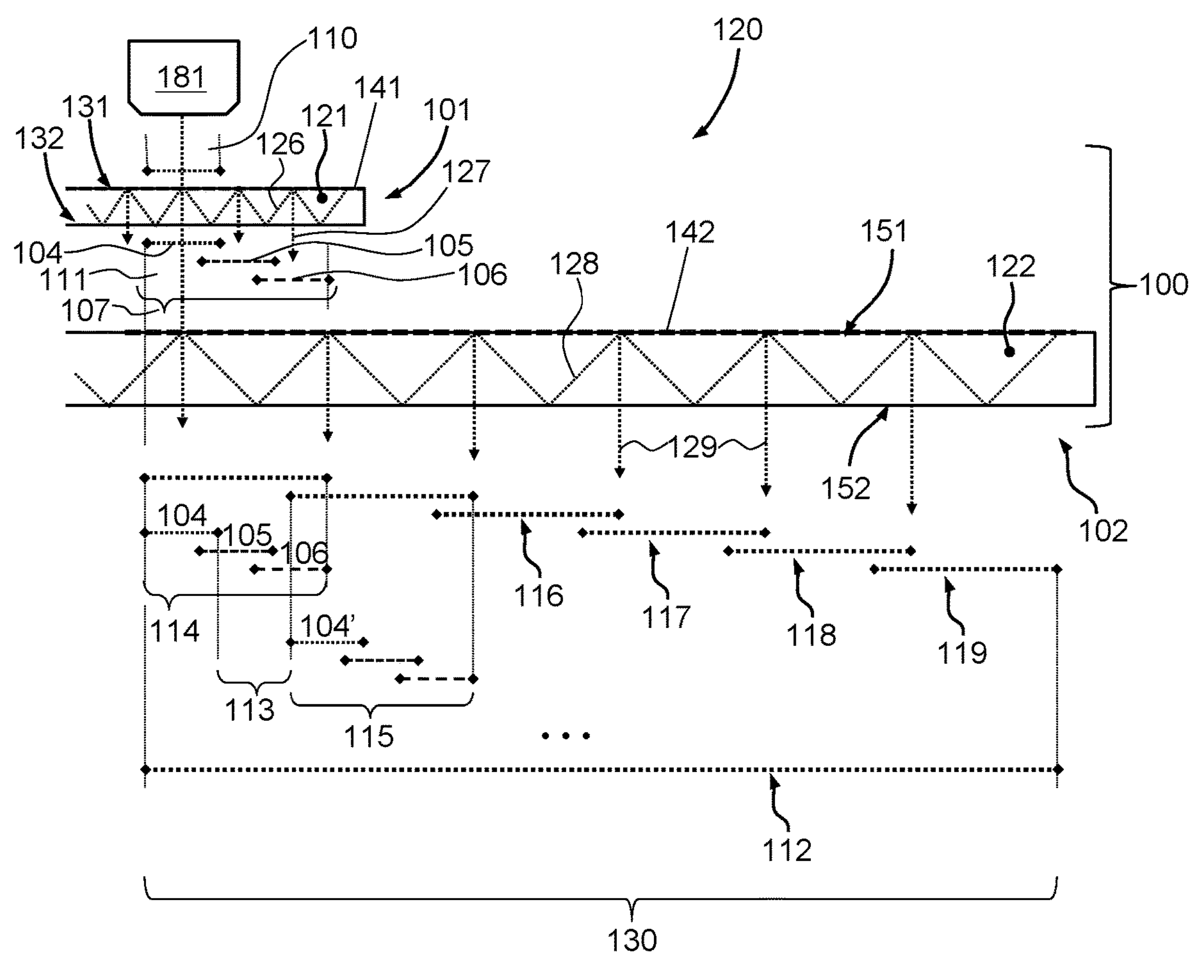
FIG. 1 is a schematic side view of a near-eye display (NED) including a waveguide assembly of the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

A pupil-replicating waveguide may be used to carry an image from a projector to an eye of a user. A high degree of flatness and parallelism of waveguide surfaces is required to maintain good quality of the observed image. It is easier to polish a thicker optical component, such as a waveguide, to high flatness and parallelism. However, a thicker pupil-replicating waveguides may have areas of output pupil where image brightness sharply drops due to so-called gaps or holes in the output pupil. The gaps may appear due to larger lateral offsets of the image beam upon reflection from outer surfaces of a thicker waveguide. In accordance with the present disclosure, the output pupil gaps may be reduced or even completely eliminated by providing an additional pupil-replicating waveguide upstream of the thicker waveguide. The additional waveguide may expand the input beam enough to close the output pupil gaps of the thicker waveguide.

In accordance with the present disclosure, there is provided a waveguide assembly comprising cascaded first and second pupil-replicating waveguides. The first pupil-replicating waveguide is configured for receiving a first input beam of image light and providing a first intermediate beam comprising multiple offset portions of the first input beam, and the second pupil-replicating waveguide is configured for receiving the first intermediate beam from the first pupil-replicating waveguide and providing a first output beam comprising multiple offset portions of the first intermediate beam. The first pupil-replicating waveguide has a first replication offset between the multiple offset portions of the first input beam, and the second pupil-replicating waveguide has a second replication offset between the multiple offset portions of the first intermediate beam; the first replication offset may be smaller than the second replication offset.

In some embodiments, a spot size of the first intermediate beam is greater than a spot size of the first input beam, but less than twice the spot size of the first input beam. The first pupil-replicating waveguide may include a first substrate comprising first and second surfaces for propagating the first input beam in the first substrate by reflecting the first input beam from the first and second surfaces of the first substrate, and a first diffraction grating supported by the first substrate in an optical path of the first input beam and configured for diffracting the first input beam impinging thereon for providing the multiple offset portions of the first input beam. In some embodiments, the first diffraction grating includes a first plurality of grating lines running parallel to one another and a second plurality of grating lines running parallel to one another and at an angle to the grating lines of the first plurality. In some embodiments, the first diffraction grating includes a two-dimensional array of features for diffracting the first input beam in first and second non-parallel directions.

The second pupil-replicating waveguide may include a second substrate comprising first and second surfaces for propagating the first intermediate beam in the second substrate by reflecting the first intermediate beam from the first and second surfaces of the second substrate, and a second diffraction grating supported by the second substrate in an optical path of the first intermediate beam and configured for diffracting the first intermediate beam impinging thereon for providing the multiple offset portions of the first intermediate beam. The first pupil-replicating waveguide may further include a third diffraction grating supported by the first substrate in the optical path of the first input beam and configured for diffracting the first input beam impinging thereon for at least one of splitting or redirecting the first input beam.

In some embodiments, the waveguide further includes cascaded third and fourth pupil-replicating waveguides. The third pupil-replicating waveguide may be configured for receiving a second input beam of the image light and providing a second intermediate beam comprising multiple offset portions of the second input beam. The fourth pupil-replicating waveguide may be configured for receiving the second intermediate beam from the third pupil-replicating waveguide and providing a second output beam comprising multiple offset portions of the second intermediate beam.

The waveguide may further include cascaded fifth and sixth pupil-replicating waveguides. The fifth pupil-replicating waveguide may be configured for receiving a third input beam of the image light and providing a third intermediate beam comprising multiple offset portions of the third input beam. The sixth pupil-replicating waveguide may be configured for receiving the third intermediate beam from the fifth pupil-replicating waveguide and providing a third output beam comprising multiple offset portions of the third intermediate beam. The first, second, and third input beams may include first, second, and third color channels of the image light, respectively.

The second, fourth, and sixth pupil-replicating waveguides may be disposed in a stack configuration. The fourth pupil-replicating waveguide may be configured for propagating the first output beam therethrough substantially without reflecting the first output beam therein. The sixth pupil-replicating waveguide may be configured for propagating the first and second output beams therethrough substantially without reflecting the first and second output beams therein.

In accordance with the present disclosure, there is provided a near-eye display (NED) comprising a first light source for providing a first input beam of image light, and first and second pupil-replicating waveguides. The first pupil-replicating waveguide is configured for receiving the first input beam and providing a first intermediate beam comprising multiple offset portions of the first input beam. The second pupil-replicating waveguide is configured for receiving the first intermediate beam from the first pupil-replicating waveguide and providing a first output beam comprising multiple offset portions of the first intermediate beam. In some embodiments, the second pupil-replicating waveguide is thicker than the first pupil-replicating waveguide, and/or the second pupil-replicating waveguide is longer than the first pupil-replicating waveguide in a direction of offset of the multiple offset portions of the first intermediate beam in the second pupil-replicating waveguide.

In some embodiments, the NED further includes second and third light sources for providing second and third input beams of image light, respectively. The first, second, and third input beams comprise first, second, and third color channels of the image light. The NED may further include cascaded third and fourth pupil-replicating waveguides. The third pupil-replicating waveguide may be configured for receiving the second input beam of the image light and providing a second intermediate beam comprising multiple offset portions of the second input beam. The fourth pupil-replicating waveguide may be configured for receiving the second intermediate beam from the second pupil-replicating waveguide and providing a second output beam comprising multiple offset portions of the second intermediate beam. The NED may further include cascaded fifth and sixth pupil-replicating waveguides. The fifth pupil-replicating waveguide may be configured for receiving the third input beam of the image light and providing a third intermediate beam comprising multiple offset portions of the third input beam. The sixth pupil-replicating waveguide may be configured for receiving the third intermediate beam from the fifth pupil-replicating waveguide and providing a third output beam comprising multiple offset portions of the third intermediate beam.

In some embodiments, the second, fourth, and sixth pupil-replicating waveguides are disposed in a stack configuration. The fourth pupil-replicating waveguide may be configured for propagating the first output beam therethrough substantially without reflecting the first output beam therein. The sixth pupil-replicating waveguide may be configured for propagating the first and second output beams therethrough substantially without reflecting the first and second output beams therein.

In accordance with the present disclosure, there is further provided a method for expanding an input beam of image light. The method includes propagating the input beam in a first pupil-replicating waveguide to obtain an intermediate beam comprising multiple offset portions of the input beam, and propagating the intermediate beam in a second pupil-replicating waveguide to obtain an output beam comprising multiple offset portions of the intermediate beam. A replication offset between the multiple offset portions of the input beam may be smaller than a replication offset between the multiple offset portions of the intermediate beam. The multiple offset portions of the input beam in the first pupil-replicating waveguide may be offset in first and second non-parallel directions.

Referring now to FIG. 1, a near-eye display (NED) 120 includes a light source 181 for providing an input beam 110 of image light to a waveguide assembly 100. The image light may include an image in angular domain, to be presented to a user for a direct observation, i.e. without projecting on a screen. The waveguide assembly 100 includes cascaded first 101 and second 102 pupil-replicating waveguides. The first pupil-replicating waveguide 101 is configured for receiving the input beam 110 and providing an intermediate beam 111 including multiple offset portions, e.g. portions 104 (dotted lines), 105 (short-dash lines), 106 (long-dash lines) of the input beam 110 at an exit pupil 107 of the first pupil-replicating waveguide 101. The second pupil-replicating waveguide 102 is configured for receiving the intermediate beam 111 from the first pupil-replicating waveguide 101 and providing an output beam 112 including multiple offset portions 114, 115, 116, 117, 118, and 119 of the first intermediate beam 101 at an exit pupil 130 of the second pupil-replicating waveguide 102.

In the embodiment shown in FIG. 1, the first pupil-replicating waveguide 101 includes a first substrate 121 having opposed first 131 and second 132 optical surfaces. In operation, the input beam 110 propagates in the first substrate 121 by reflecting, e.g. by total internal reflection (TIR), from the first 131 and second 132 optical surfaces in a zigzag manner, forming a first optical path 126 shown with dotted lines. It is to be noted that the input beam 110 may propagate both to the left and to the right in FIG. 1, as illustrated. A first diffraction grating 141 (thick dashed line) may be supported by the first substrate 121 in the first optical path 126 of the input beam 110 and configured for diffracting the input beam 110 impinging onto the first diffraction grating 141, as illustrated with dotted-line rays 127, for providing the corresponding mutually offset portions 104, 105, 106 of the input beam 110.

The second pupil-replicating waveguide 102 may include a second substrate 122 having opposed first 151 and second 152 optical surfaces. In operation, the intermediate beam 111 propagates in the second substrate 122 by zigzag reflections from its first 151 and second 152 surfaces, forming a second optical path 128 (dotted lines), optionally extending both to the left and to the right in FIG. 1, as shown. A second diffraction grating 142 (thick dashed line) may be supported by the second substrate 122 in the second optical path 128 of the intermediate beam 111 and configured for diffracting the intermediate beam 111 impinging onto the second diffraction grating 142, as illustrated with dotted-line rays 129, thus providing the multiple offset portions 114-119 of the intermediate beam 111.

An advantage brought by introducing the first pupil-replicating waveguide 101 into the waveguide assembly 100 may be illustrated by initially considering optical performance of the waveguide assembly 100 without the first pupil-replicating waveguide 101. If the first pupil-replicating waveguide 101 were absent, then the second pupil-replicating waveguide 102 would receive only one of the replicated portions 104-106, specifically the leftmost portion 104 (shown in dotted lines). The second pupil-replicating waveguide 102 would then replicate the leftmost portion 104, providing a second portion 104'; however these two portions, 104 and 104', would be separated by a pupil gap 113, and accordingly, an eye would receive no image when placed in the pupil gap 113. Advantageously, the first pupil-replicating waveguide 101 fills the pupil gap 113 by providing the other replicated beam portions 105 and 106. In other words, the first pupil-replicating waveguide 101 fills the pupil gaps by expanding the input beam 110 before it enters the second pupil-replicating waveguide 102. This allows the second pupil-replicating waveguide 102 to be made thicker and thus easier to manufacture to a required degree of flatness and parallelism across the entire length of the second pupil-replicating waveguide 102. Among other things, the increased thickness enables the second substrate 122 to also be more mechanically stable.

A replication offset between the multiple offset portions 104-106 of the input beam 110 provided by the first pupil-replicating waveguide 101 may remain relatively small; for example, the replication offset may remain smaller than a replication offset between the multiple offset portions 114-119 of the intermediate beam 111 provided by the second pupil-replicating waveguide 102. The smaller replication offset of the first pupil-replicating waveguide 101 may be due to a smaller thickness of the first pupil-replicating waveguide 101, a smaller angular dispersion of the first diffraction grating 141, or both, as compared to the thickness of the second pupil-replicating waveguide 102 and the angular dispersion of the second diffraction grating 142, respectively. The smaller thickness and/or the angular dispersion of the first pupil-replicating waveguide 101 enables first pupil-replicating waveguide 101 to support a portion of the FOV supported by the second pupil replicating waveguide 102. In one embodiment, a spot size of the intermediate beam 111 is greater than a spot size of the input beam 110, but less than twice the spot size of the input beam 110. It may be desirable to reduce a distance between the first 101 and second 102 pupil-replicating waveguides to reduce the height of the assembly; however it is to be noted that the first 101 and second 102 pupil-replicating waveguides should not optically contact each other, to avoid affecting TIR in these waveguides, if used. A plurality of spacers, e.g. glass beads of at least 3-4 micrometers in diameter, may be placed on the perimeter of the first pupil-replicating waveguide 101 to ensure a fixed spaced apart relationship between the first 101 and second 102 pupil-replicating waveguides.

Figure 2A:
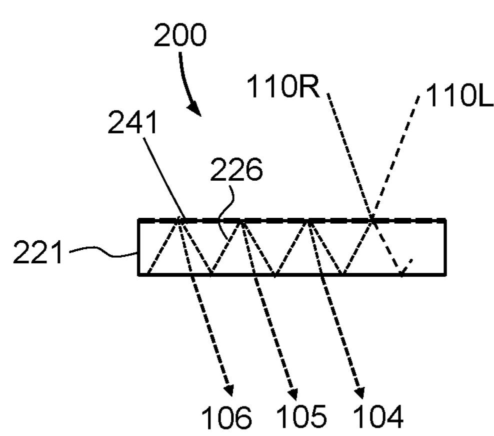
FIG. 2A is a side cross-sectional view of a waveguide of the waveguide assembly of FIG. 1, the waveguide including a one-dimensional (1D) diffraction grating.
Figure 2B:
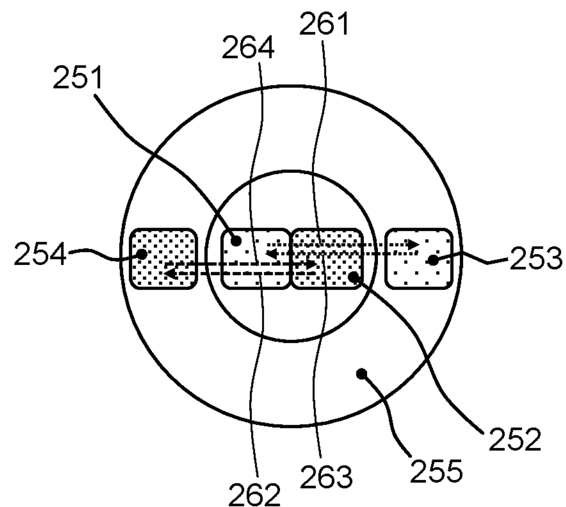
FIG. 2B is a k-vector diagram illustrating beam redirection and splitting in the waveguide of FIG. 2A.

Examples of configuring the first 101 and second 102 pupil-replicating waveguides for receiving a beam of light and providing multiple offset beam portions of the beam will now be considered. Referring first to FIG. 2A, a waveguide 200 is an embodiment of the first waveguide 101 of FIG. 1, the second waveguide 102, or both. The waveguide 200 of FIG. 2A includes a surface-relief grating (SRG) 241 supported by a substrate 221. The SRG 241 is a one-dimensional (1D) grating, that is, it includes a plurality of grooves running parallel to each other for diffracting a beam of light in a plurality of directions in a single plane. In operation, a first input ray 110R propagates through the substrate 221 providing the leftmost beam portion 104, as well as diffracts on the SRG 241 in the plane of FIG. 2A. The diffraction redirects the first input ray 110R to reflect from inside the substrate 221 by TIR, forming a zigzag optical path 226. Upon each encounter with the SRG 241, the first input ray 110R diffracts, producing the center 105 and the rightmost 106 portions of the intermediate beam 111. The beam diffraction and redirection is schematically represented in FIG. 2B, which shows left 251 and right 252 halves of a field of view (FOV) of the image to be displayed, and corresponding angular areas 253 and 254 for angles of diffracted light within a donut-shaped area 255 representing an angular range where the beam propagation effectively occurs by TIR in the substrate 221. The initial diffraction of the first input ray 110R (dotted lines) is represented by a first forward k-vector 261 of FIG. 2B, and a subsequent diffraction, i.e. the diffraction which out-couples the corresponding beam portions 105 and 106 is represented by a first reverse k-vector 263 of equal magnitude and opposite direction, such that an original direction of the beam portions 105 and 106 is preserved. For a second input ray 110L (dashed lines) propagating to the left in FIG. 2A, the initial diffraction is represented by a second forward k-vector 262 of FIG. 2B, and a subsequent out-coupling diffraction is represented by a second reverse k-vector 264 of equal magnitude and opposite direction.

Figure 3A:
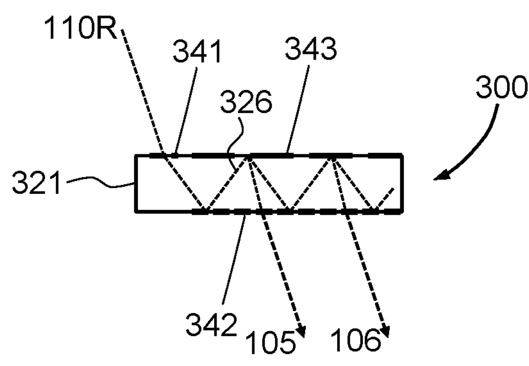
FIG. 3A is a side cross-sectional view of a waveguide of the waveguide assembly of FIG. 1, the waveguide including a pair of 1D diffraction gratings disposed opposite one another.

Referring to FIG. 3A, a waveguide 300 is an embodiment of the first waveguide 101 and/or the second waveguide 102 of FIG. 1. The waveguide 300 of FIG. 3A may include at least two diffraction gratings, i.e. the first waveguide 101, the second waveguide 102, or both the first 101 and second 102 waveguides may include at least two diffraction gratings. In the embodiment shown, the waveguide 300 includes three diffraction gratings: an in-coupling grating 341, a redirecting grating 342, and an out-coupling grating 343, all 1D diffraction gratings supported by a substrate 321 in an optical path 326 of the first input ray 110R. The in-coupling grating 341 diffracts impinging first input ray 110R to propagate in the substrate 321 by TIR, and the redirecting grating 342 diffracts the impinging first input ray 110R into $+1^{st}$ and $-1^{st}$ diffraction orders, thereby splitting and redirecting the first input ray 110R, the portions of which 105, 106 are then out-coupled by diffracting on the out-coupling grating 343. The second input ray 110L is not shown in FIG. 3A for brevity.

Figure 3B:
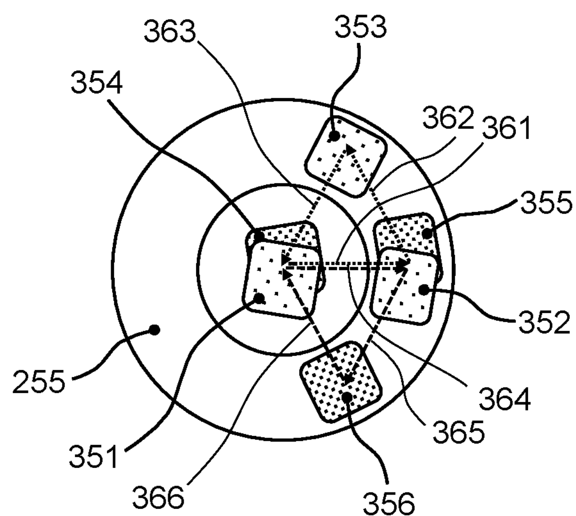
FIG. 3B is a k-vector diagram illustrating beam redirection and splitting in the waveguide of FIG. 3A.

This process of diffraction and redirection is schematically illustrated in a k-vector diagram of FIG. 3B showing two possible paths of propagation of the first input ray 110R in the substrate 321 (FIG. 3A) along with corresponding angular areas representing the angular range for each particular beam path. In a first path illustrated by dotted lines, a first k-vector 361 (FIG. 3B) associated with a first field of view portion 351 corresponds to diffraction on the in-coupling grating 341, with angles of resulting rays landing within a second angular area 352. The redirecting grating 342 redirects the landed rays to a third angular area 353 by diffracting into a $+1^{st}$ diffraction order as represented by a second k-vector 362. Then, the out-coupling grating 343 diffracts the rays out at the same angles as corresponding input rays, as represented by a third k-vector 363, forming the beam portions 105 and 106. The beam redirection along a second path, illustrated with dashed lines, corresponds to diffraction into a $-1^{st}$ diffraction order, and otherwise occurs similarly. The second path beam redirection is represented by a second field of view portion 354, fourth 364, fifth 365, and sixth 366 k-vectors, and corresponding angular areas 355 and 356.

Figure 4A:
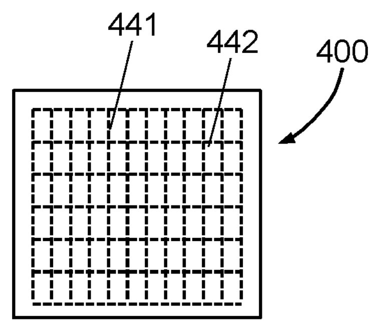
FIG. 4A is a plan view of a waveguide of the waveguide assembly of FIG. 1, the waveguide including a two-dimensional (2D) diffraction grating including a pair of superimposed 1D diffraction gratings.
Figure 4B:
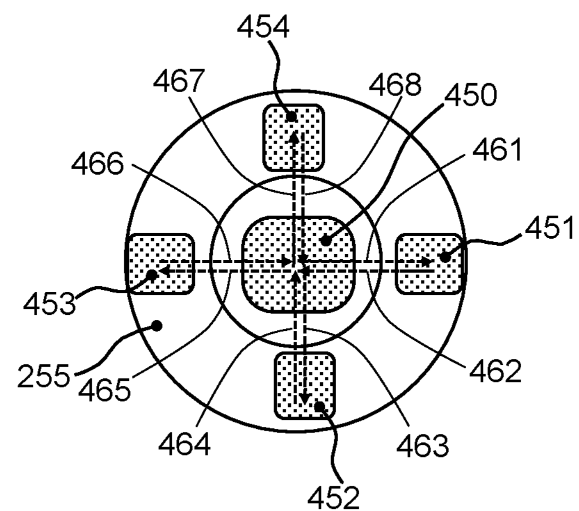
FIG. 4B is a k-vector diagram illustrating beam redirection and splitting in the waveguide of FIG. 4A.

Turning to FIG. 4A, a waveguide 400 is an embodiment of the first waveguide 101 and/or the second waveguide 102 of FIG. 1. The waveguide 400 of FIG. 4A includes a two-dimensional (2D) diffraction grating having a first plurality of grating lines 441 running parallel to one another, and a second plurality of grating lines 442 running parallel to one another and at an angle to the grating lines 441 of the first plurality. The two nonparallel pluralities of grating lines 441 and 442 form a 2D pattern for diffracting a beam of light in two non-parallel directions. In the embodiment shown in FIG. 4A, first 441 and second 442 pluralities of grating lines are perpendicular to each other, forming a rectangular pattern of features for diffracting the rays up-down and left-right. The angular dispersions of the first diffraction grating may be different in the two non-parallel directions of diffraction, as shown. A corresponding k-vector diagram of FIG. 4B includes four pairs of k-vectors, a first pair 461-462, a second pair 463-464, a third pair 465-466, and a fourth pair 467-468. The resulting field of view is shown at 450, and four surrounding angular areas corresponding to the k-vector pairs are shown at 451, 452, 453, and 454.

Figure 5A:
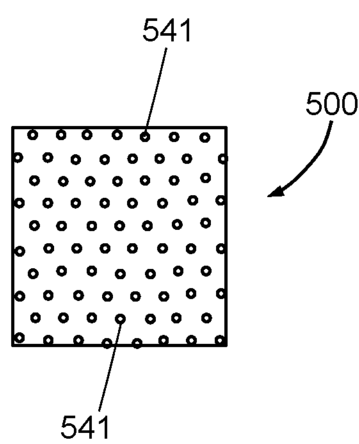
FIG. 5A is a plan view of a waveguide of the waveguide assembly of FIG. 1, the waveguide including a 2D diffraction grating having a hexagonal array of features.
Figure 5B:
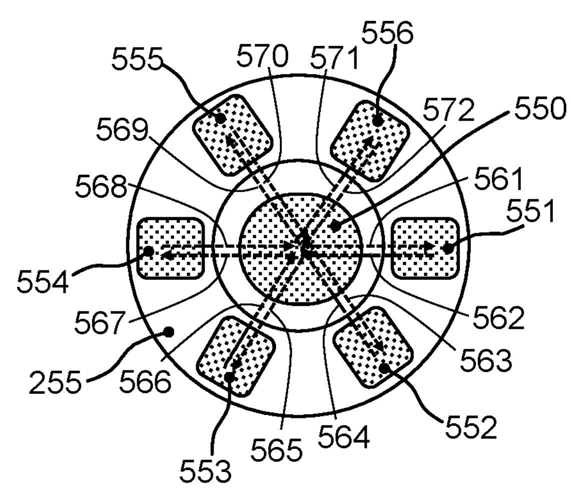
FIG. 5B is a k-vector diagram illustrating beam redirection and splitting in the waveguide of FIG. 5A.

Referring now to FIG. 5A, a waveguide 500 can be used for the first waveguide 101 and/or the second waveguide 102 of FIG. 1. The waveguide 500 of FIG. 5 is similar to the waveguide 400 of FIG. 4, but includes a hexagonal 2D array of features 541 forming a 2D diffraction grating for diffracting a beam of light in three planes at 120 degrees to each other. A corresponding k-vector diagram of FIG. 5B includes six pairs of k-vectors, a first pair 561-562, a second pair 563-564, a third pair 565-566, a fourth pair 567-568, a fifth pair 569-570, and a sixth pair 571-572. The resulting field of view is shown at 550, and six surrounding angular areas corresponding to the k-vector pairs are shown at 551, 552, 553, 554, 555, and 556. It is further noted that the diffraction gratings shown in FIGS. 2A-5A may include SRGs, volume Bragg gratings (VBGs), polarization volume gratings, etc. The gratings may be disposed proximate the outer surfaces or inside (e.g. in the middle) of respective substrates.

Figure 6A:
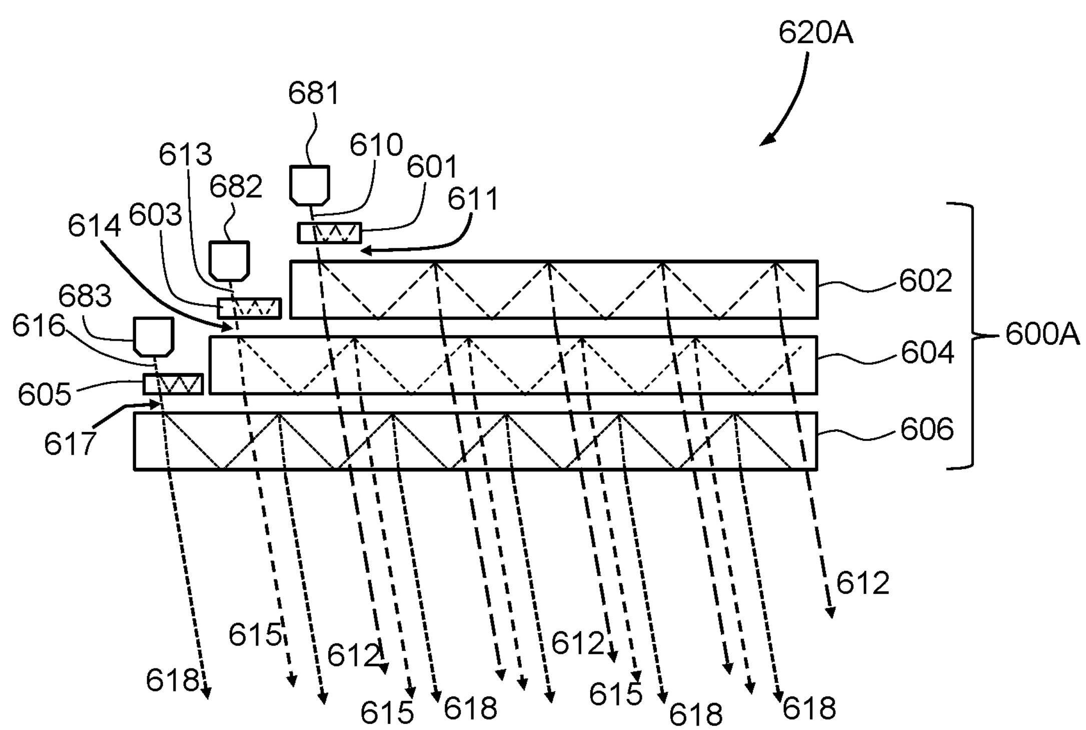
FIG. 6A is a side cross-sectional view of an NED including cascaded waveguide assemblies for different color channels of image light.

Referring to FIG. 6A, an NED 620 includes first 681, second 682, and third 683 light sources providing first 610, second 613, and third 616 input beams of image light, respectively, each beam carrying a dedicated color channel, e.g. red, green, and blue color channel of image light to be carried to a user's eye. The image light may include an image in angular domain to be presented to a user for a direct observation, i.e. without projecting the image on a screen. To carry the image, the NED 620 includes a cascaded waveguide assembly 600A comprising three pairs of pupil-replicating waveguides, each light source being optically coupled to a particular pair of pupil-replicating waveguides carrying light of a particular color channel. For example, a first pair includes first 601 and second 602 cascaded pupil-replicating waveguides. The first pupil-replicating waveguide 601 is configured to receive the first input beam 610 of image light from the first light source 681 comprising the first color channel. The first pupil-replicating waveguide 601 provides a first intermediate beam 611 comprising multiple offset portions of the first input beam 610, similarly to the waveguide assembly 100 of FIG. 1. The second pupil-replicating waveguide 602 is configured for receiving the first intermediate beam 611 from the first pupil-replicating waveguide 601 and providing a first output beam 612 (long-dash arrows) comprising multiple offset portions of the first intermediate beam 611, similarly to NED 120 of FIG. 1. To that end, the first 601 and second 602 pupil-replicating waveguides can be based on the waveguides 200 of FIG. 2A, 300 of FIG. 3A, 400 of FIG. 4A, and/or 500 of FIG. 5A.

A second pair of pupil-replicating waveguides of the waveguide assembly 100 includes cascaded third 603 and fourth 604 pupil-replicating waveguides. The third pupil-replicating waveguide 603 is configured for receiving the second input beam 613 of the image light and providing a second intermediate beam 614 comprising multiple offset portions of the second input beam 613. The fourth pupil-replicating waveguide 604 is configured for receiving the second intermediate beam 614 from the third pupil-replicating waveguide 603 and providing a second output beam 615 (short-dash arrows) comprising multiple offset portions of the second intermediate beam 614. In a similar manner, a third pair of pupil-replicating waveguides includes cascaded fifth 605 and sixth 606 pupil-replicating waveguides. The fifth pupil-replicating waveguide 605 is configured for receiving the third input beam 616 of the image light and providing a third intermediate beam 617 comprising multiple offset portions of the third input beam 616. The sixth pupil-replicating waveguide 606 is configured for receiving the third intermediate beam 617 from the fifth pupil-replicating waveguide 605 and providing a third output beam 618 (dotted-line arrows) comprising multiple offset portions of the third intermediate beam 617. The third 603, fourth 604, fifth 605, and sixth 606 pupil-replicating waveguides can be based on the waveguides 200 of FIG. 2A, 300 of FIG. 3A, 400 of FIG. 4A, and/or 500 of FIG. 5A.

In the embodiment shown in FIG. 6A, the second 602, fourth 604, and sixth 606 pupil-replicating waveguides are disposed in a stack configuration, that is, stacked together, with a small gap in between. The first 601, third 603, and fifth 605 pupil-replicating waveguides may be supported by the second 602, fourth 604, and sixth 606 pupil-replicating waveguides on a side of the respective waveguides 602, 604, and 606, the third pupil-replicating waveguide 603 being disposed adjacent the second pupil-replicating waveguide 602, and the fifth pupil-replicating waveguide 605 being disposed adjacent the fourth pupil-replicating waveguide 604, as shown. The fourth pupil-replicating waveguide 604 can be configured for propagating the first output beam 612 directly through the thickness of the fourth pupil-replicating waveguide 604, such that the first output beam 612 is not redirected to propagate in the fourth pupil-replicating waveguide 604 by internal reflections from its surfaces. Similarly, the sixth pupil-replicating waveguide 606 is configured for propagating the first 612 and second 615 output beams directly through the thickness of the sixth pupil-replicating waveguide 606, such that the first 612 and second 615 output beams are not redirected to propagate in the sixth pupil-replicating waveguide 606 by internal reflections. The second 602, fourth 604, and sixth 606 pupil-replicating waveguides are fixed in a spaced-apart relationship to prevent optical contact between the waveguides, to make sure that the TIR of the output beams 612, 615, and 618 is not affected. Glass beads of a suitable diameter, or other spacers of a controlled size may be used for this purpose. The waveguides of individual waveguide pairs, that is, 601-602, 603-604, and 605-606 may also need to be separated at some minimal distance, for a same reason of making sure the TIR in the waveguides is not affected.

Figure 6B:
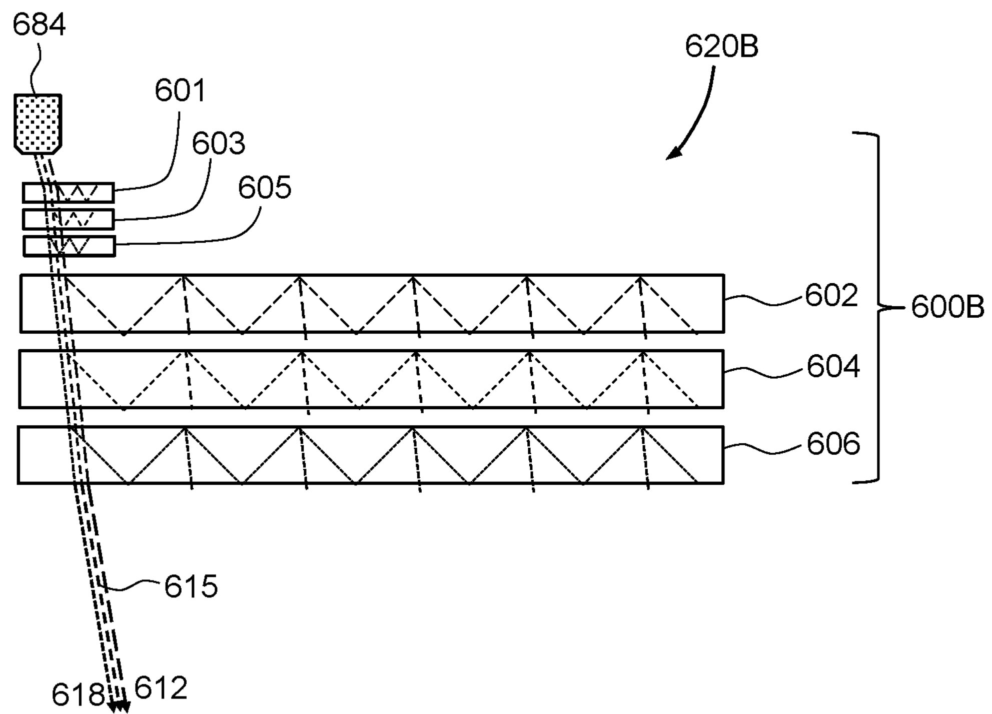
FIG. 6B is a side cross-sectional view of an NED including stacked waveguide assemblies for different color channels of image light.

Turning to FIG. 6B, an NED 620B is similar to the NED 620A of FIG. 6A. The NED 620B includes a stacked waveguide assembly 600B having the first 601, third 603, and fifth 605 pupil-replicating waveguides stacked together, and the second 602, fourth 604, and sixth 606 pupil-replicating waveguides stacked together, forming a stacked waveguide assembly 600B. The first 601 and second 602 pupil-replicating waveguides are configured to expand the beam of the first color channel, the third 603 and fourth 604 pupil-replicating waveguides are configured to expand the beam of the second color channel, and the fifth 605 and sixth 606 pupil-replicating waveguides are configured to expand the beam of the third color channel. A single multi-colored light source 684 provides beams 612, 615, and 618 corresponding to different color channels.

Figure 7:
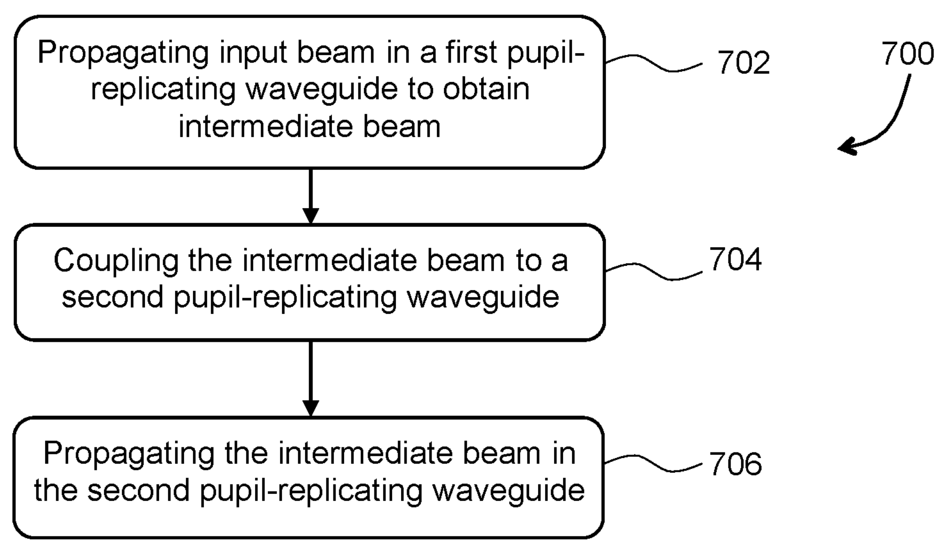
FIG. 7 is a flow chart of a method for expanding a beam of image light in accordance with the present disclosure.

Turning to FIG. 7, a method 700 for expanding an input beam of image light includes propagating (702) the input beam of image light in a first pupil-replicating waveguide, e.g. the pupil-replicating waveguide 101 of FIG. 1, to obtain an intermediate beam comprising multiple offset portions of the input beam. The intermediate beam is coupled (704 in FIG. 7) to a second pupil-replicating waveguide, e.g. the second pupil-replicating waveguide 102 of FIG. 1, and is propagated (706 in FIG. 7) in the second pupil-replicating waveguide to obtain an output beam comprising multiple offset portions of the intermediate beam. In some embodiments, a replication offset between the multiple offset portions of the input beam is smaller than a replication offset between the multiple offset portions of the intermediate beam. This enables one to make the second pupil-replicating waveguide thicker and/or longer with good flatness and parallelism of TIR surfaces. The replication offset may occur independently in two dimensions; in other words, the multiple offset portions of the input beam in the first replicating waveguide may be independently offset in first and second non-parallel directions, by different amounts if required. This provides flexibility in filling pupil gaps in X and Y directions in the plane of an eyebox of a visual display.

Figure 8A:
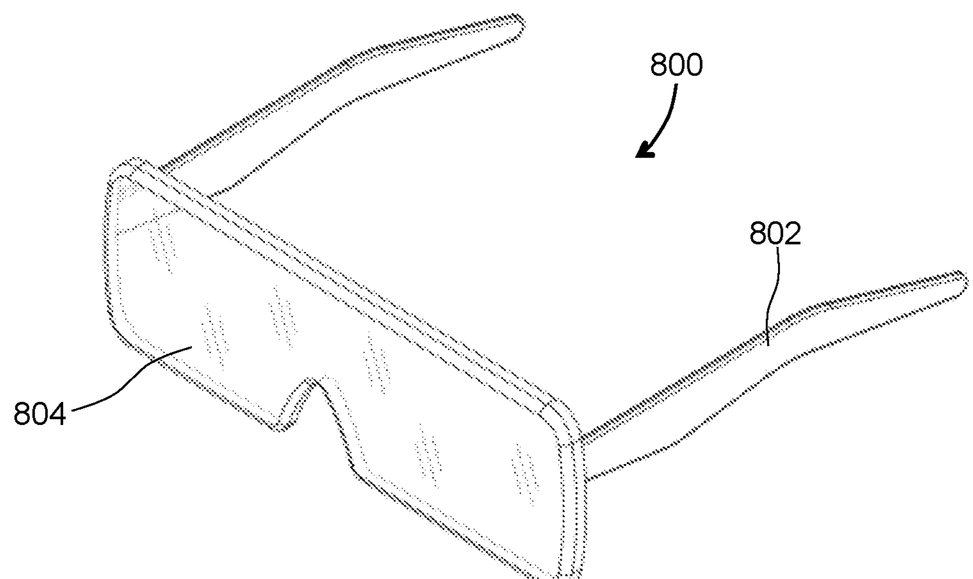
FIG. 8A is an isometric view of an eyeglasses form factor near-eye augmented reality (AR)/virtual reality (VR) display incorporating a waveguide assembly of the present disclosure.
Figure 8B:
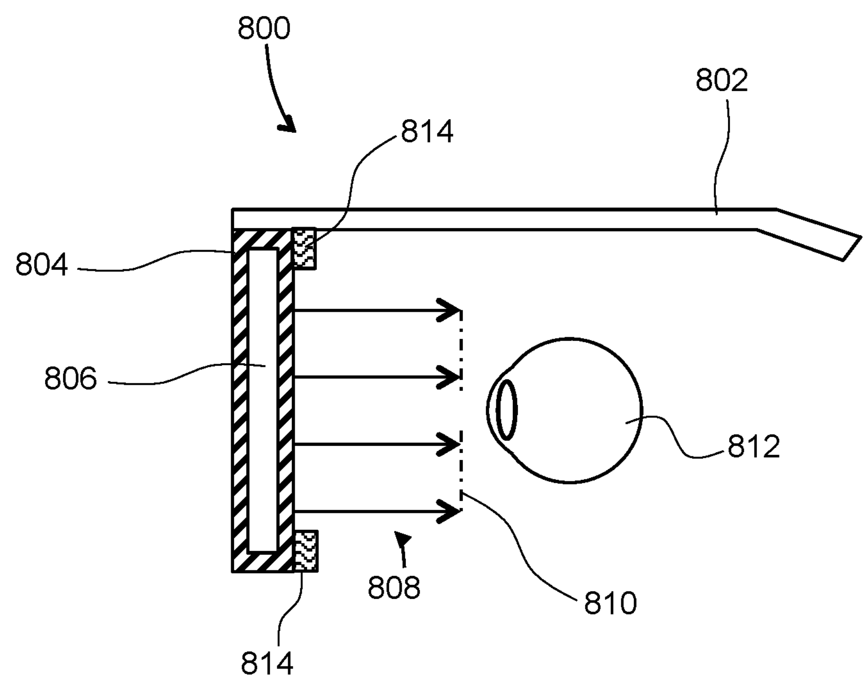
FIG. 8B is a side cross-sectional view of the AR/VR display of FIG. 8A.

Referring to FIGS. 8A and 8B, a near-eye augmented reality (AR)/virtual reality (VR) display 800 includes a body or frame 802 having a form factor of a pair of eyeglasses. A display 804 includes a waveguide assembly 806 (FIG. 8B), which provides image light 808 to an eyebox 810, i.e. a geometrical area where a good-quality image may be presented to a user's eye 812. The waveguide assembly 806 may include any of the waveguide assemblies described herein, e.g. the waveguide assembly 100 of FIG. 1 and/or the waveguide assemblies 600A, 600B of FIGS. 6A, 6B.

An image light source of the near-eye AR/VR display 800 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye AR/VR display 800 may further include an eye-tracking system 814 for determining, in real time, the gaze direction and/or the vergence angle of the user's eyes 812. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Yet furthermore, the near-eye AR/VR display 800 may include an audio system, such a set of small speakers or headphones, not shown.

Figure 9:
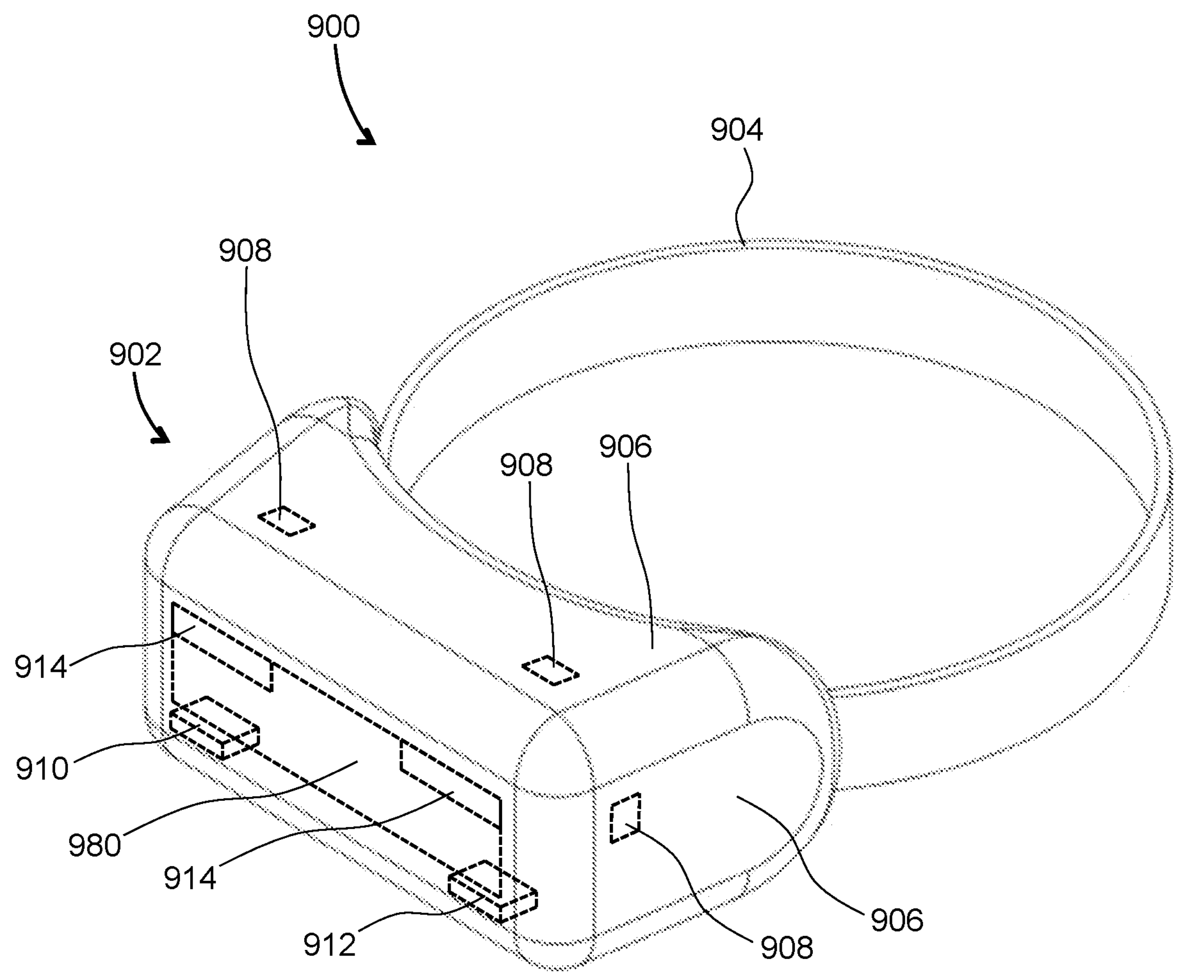
FIG. 9 is an isometric view of a head-mounted display (HMD) incorporating a waveguide assembly of the present disclosure.

Turning now to FIG. 9, an HMD 900 is an example of an AR/VR wearable display system enclosing user's eyes for a greater degree of immersion into the AR/VR environment. The HMD 900 may be a part of an AR/VR system including a user position and orientation tracking system, an external camera, a gesture recognition system, control means for providing user input and controls to the system, and a central console for storing software programs and other data for interacting with the user for interacting with the AR/VR environment. The functional purpose of the HMD 900 is to augment views of a physical, real-world environment with computer-generated imagery, and/or to generate entirely virtual 3D imagery. The HMD 900 may include a front body 902 and a band 904. The front body 902 is configured for placement in front of eyes of the user in a reliable and comfortable manner, and the band 904 may be stretched to secure the front body 902 on the user's head. A display system 980 may include any of the waveguide assemblies described herein. The display system 980 may be disposed in the front body 902 for presenting AR/VR images to the user. Sides 906 of the front body 902 may be opaque or transparent.

In some embodiments, the front body 902 includes locators 908, an inertial measurement unit (IMU) 910 for tracking acceleration of the HMD 900 in real time, and position sensors 912 for tracking position of the HMD 900 in real time. The locators 908 may be traced by an external imaging device of a virtual reality system, such that the virtual reality system can track the location and orientation of the HMD 900 in real time. Information generated by the IMU and the position sensors 912 may be compared with the position and orientation obtained by tracking the locators 908, for improved tracking of position and orientation of the HMD 900. Accurate position and orientation is important for presenting appropriate virtual scenery to the user as the latter moves and turns in 3D space.

The HMD 900 may further include an eye tracking system 914, which determines orientation and position of user's eyes in real time. The obtained position and orientation of the eyes allows the HMD 900 to determine the gaze direction of the user and to adjust the image generated by the display system 980 accordingly. In one embodiment, the vergence, that is, the convergence angle of the user's eyes gaze, is determined. The determined gaze direction and vergence angle may be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 902.

The present disclosure is not to be limited in scope by the specific embodiments described herein. Other various embodiments and modifications, in addition to those described herein, will be apparent to those of ordinary skill in the art from the foregoing description and accompanying drawings. Such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A waveguide assembly comprising cascaded first and second pupil-replicating waveguides, wherein the first pupil-replicating waveguide is configured for receiving a first input beam of image light and providing a first intermediate beam comprising multiple offset portions of the first input beam, and wherein the second pupil-replicating waveguide is configured for receiving the first intermediate beam from the first pupil-replicating waveguide and providing a first output beam comprising multiple offset portions of the first intermediate beam.

2. The waveguide assembly of claim 1, wherein the first pupil-replicating waveguide has a first replication offset between the multiple offset portions of the first input beam; wherein the second pupil-replicating waveguide has a second replication offset between the multiple offset portions of the first intermediate beam; and wherein the first replication offset is smaller than the second replication offset.

3. The waveguide assembly of claim 1, wherein a spot size of the first intermediate beam is greater than a spot size of the first input beam, but less than twice the spot size of the first input beam.

4. The waveguide assembly of claim 1, wherein the first pupil-replicating waveguide comprises:

a first substrate comprising first and second surfaces for propagating the first input beam in the first substrate by reflecting the first input beam from the first and second surfaces of the first substrate; and a first diffraction grating supported by the first substrate in an optical path of the first input beam and configured for diffracting the first input beam impinging thereon for providing the multiple offset portions of the first input beam.

5. The waveguide assembly of claim 4, wherein the first diffraction grating comprises a first plurality of grating lines running parallel to one another and a second plurality of grating lines running parallel to one another and at an angle to the grating lines of the first plurality.

6. The waveguide assembly of claim 4, wherein the first diffraction grating comprises a two-dimensional array of features for diffracting the first input beam in first and second non-parallel directions.

7. The waveguide assembly of claim 4, wherein the second pupil-replicating waveguide comprises:

a second substrate comprising first and second surfaces for propagating the first intermediate beam in the second substrate by reflecting the first intermediate beam from the first and second surfaces of the second substrate; and a second diffraction grating supported by the second substrate in an optical path of the first intermediate beam and configured for diffracting the first intermediate beam impinging thereon for providing the multiple offset portions of the first intermediate beam.

8. The waveguide assembly of claim 7, wherein the second substrate is longer than the first substrate in a direction of offset of the multiple offset portions of the first intermediate beam in the second substrate.

9. The waveguide assembly of claim 7, wherein at least one of: the second substrate is thicker than the first substrate; or the second diffraction grating has a larger angular dispersion than the first diffraction grating.

10. The waveguide assembly of claim 7, wherein the first diffraction grating comprises a first surface relief grating (SRG), and wherein the second diffraction grating comprises a second SRG.

11. The waveguide assembly of claim 4, wherein the first pupil-replicating waveguide further comprises a third diffraction grating supported by the first substrate in the optical path of the first input beam and configured for diffracting the first input beam impinging thereon for at least one of splitting or redirecting the first input beam.

12. The waveguide assembly of claim 1, further comprising:

cascaded third and fourth pupil-replicating waveguides, wherein the third pupil-replicating waveguide is configured for receiving a second input beam of the image light and providing a second intermediate beam comprising multiple offset portions of the second input beam, and wherein the fourth pupil-replicating waveguide is configured for receiving the second intermediate beam from the third pupil-replicating waveguide and providing a second output beam comprising multiple offset portions of the second intermediate beam; and cascaded fifth and sixth pupil-replicating waveguides, wherein the fifth pupil-replicating waveguide is configured for receiving a third input beam of the image light and providing a third intermediate beam comprising multiple offset portions of the third input beam, and wherein the sixth pupil-replicating waveguide is configured for receiving the third intermediate beam from the fifth pupil-replicating waveguide and providing a third output beam comprising multiple offset portions of the third intermediate beam;

wherein the first, second, and third input beams comprise first, second, and third color channels of the image light, respectively.

13. The waveguide assembly of claim 12, wherein the second, fourth, and sixth pupil-replicating waveguides are disposed in a stack configuration;

wherein the fourth pupil-replicating waveguide is configured for propagating the first output beam therethrough substantially without reflecting the first output beam therein; and wherein the sixth pupil-replicating waveguide is configured for propagating the first and second output beams therethrough substantially without reflecting the first and second output beams therein.

14. A near-eye display (NED) comprising:

a first light source for providing a first input beam of image light;

a first pupil-replicating waveguide configured for receiving the first input beam and providing a first intermediate beam comprising multiple offset portions of the first input beam; and a second pupil-replicating waveguide configured for receiving the first intermediate beam from the first pupil-replicating waveguide and providing a first output beam comprising multiple offset portions of the first intermediate beam.

15. The NED of claim 14, wherein at least one of: the second pupil-replicating waveguide is thicker than the first pupil-replicating waveguide; or the second pupil-replicating waveguide is longer than the first pupil-replicating waveguide in a direction of offset of the multiple offset portions of the first intermediate beam in the second pupil-replicating waveguide.

16. The NED of claim 14, further comprising:

second and third light sources for providing second and third input beams of image light, respectively, wherein the first, second, and third input beams comprise first, second, and third color channels of the image light;

cascaded third and fourth pupil-replicating waveguides, wherein the third pupil-replicating waveguide is configured for receiving the second input beam of the image light and providing a second intermediate beam comprising multiple offset portions of the second input beam, and wherein the fourth pupil-replicating waveguide is configured for receiving the second intermediate beam from the third pupil-replicating waveguide and providing a second output beam comprising multiple offset portions of the second intermediate beam; and cascaded fifth and sixth pupil-replicating waveguides, wherein the fifth pupil-replicating waveguide is configured for receiving the third input beam of the image light and providing a third intermediate beam comprising multiple offset portions of the third input beam, and wherein the sixth pupil-replicating waveguide is configured for receiving the third intermediate beam from the fifth pupil-replicating waveguide and providing a third output beam comprising multiple offset portions of the third intermediate beam.

17. The NED of claim 16, wherein the second, fourth, and sixth pupil-replicating waveguides are disposed in a stack configuration;

wherein the fourth pupil-replicating waveguide is configured for propagating the first output beam therethrough substantially without reflecting the first output beam therein; and wherein the sixth pupil-replicating waveguide is configured for propagating the first and second output beams therethrough substantially without reflecting the first and second output beams therein.

* * * * *